3,740,185
EXHAUST PROCESS FOR THE DYEING OF
SYNTHETIC FIBRE MATERIALS
Karl Neufang and Robert Kuth, Cologne, Rutger Neeff, Leverkusen, and Gunter Breidbach, Cologne, Germany, assignors to Bayer Aktiengesellschaft, Leverkusen, Germany
No Drawing. Filed June 19, 1970, Ser. No. 47,867
Claims priority, application Germany, June 28, 1969,
P 19 32 828.0
Int. Cl. C09b 1/00, 29/00, 31/00, 51/00; D06p 1/18, 1/20, 1/68, 1/40
U.S. Cl. 8—39                  15 Claims

ABSTRACT OF THE DISCLOSURE

Exhaust process for the dyeing of synthetic fibre materials from organic, water-immiscible solvents, characterised by using for the dyeing carboxyl group-containing disperse dyestuffs.

Preferred dyestuffs are those of the metal-containing or metal-free azo dyestuff series or of the anthraquinone series.

The dyeings obtained are distinguished by a substantially good affinity and an improved fastness to sublimation.

---

The subject matter of the invention comprises an exhaust process for the dyeing of synthetic fibre materials from organic, water-immiscible solvents; the process is characterised by using for dyeing carboxyl group-containing disperse dyestuffs.

Organic, water-immiscible solvents to be used for the process according to the invention are those, the boiling point of which ranges from 40 to 170° C., e.g. aromatic hydrocarbons, such as toluene and xylene; halogenated hydrocarbons, particularly aliphatic chlorinated hydrocarbons, such as methylene chloride,
chloroform,
carbon tetrachloride,
1,1-dichloroethane,
1,2-dichloroethane,
1,1,2-trichloroethane,
1,1,1,2-tetrachloroethane,
1,1,2,2-tetrachloroethane,
pentachloroethane,
1-chloropropane,
2-chloropropane,
1,2-dichloropropane,
1,1,1-trichloropropane,
1-chlorobutane,
2-chlorobutane,
1,4-dichlorobutane,
1-chloro-2-methylpropane or
2-chloro-2-methylpropane, and aromatic chlorinated hydrocarbons, such as chlorobenzene and chlorotoluene. Tetrachloroethylene, trichloroethylene and 1,1,1-trichloroethane have been found to be particularly suitable.

The carboxyl group-containing disperse dyestuffs to be used according to the invention can be derived from any type of dyestuffs provided they contain at least one carboxyl group. The dyestuffs to be used according to the invention may belong, for example, to the series of the metal-containing or metal-free mono- or polyazo dyestuffs or (azo-)methine dyestuffs, to the series of the anthraquinone dyestuffs as well as to condensation products of the last-mentioned which contain more than three fused rings; other suitable dyestuffs are oxazine, nitrodiphenylamine-, naphthalic acid-, di- and tri-phenylmethane dyestuffs; naphtholactam condensation dyestuffs and dyestuffs based on naphthoquinone and naphthoquinoneimine as well as other condensation dyestuffs. The dyestuffs may contain, besides the carboxylic acid group or groups required according to definition, further customary substituents, such as halogen, alkyl, cycloalkyl, aralkyl, aryl alkoxy, aryloxy, nitro and sulphone groups, optionally substituted sulphonamide groups, optionally substituted or acylated amino groups, alkylthio and arylthio, hydroxyl, hydroxyalkyloxy, aminoalkyloxy, cyano, cyanoalkyl radicals as well as alkyl, aryl and aralkyl radicals otherwise substituted, and the like.

The dyestuffs contain one or more carboxyl groups which may be linked with aromatic nuclei of the dyestuff basic structure itself or with externally positioned aryl, aralkyl or aliphatic groupings. The number of carboxyl groups preferably amounts to 1–4.

A great number of dyestuffs which contain carboxyl groups are known and are produced in customary manner by transforming the appropriate preliminary dyestuff products, which are nuclear bound or exhibit one or more carboxyl groups in an external position, into the desired end products while retaining the carboxyl groups, and optionally carrying out in these products further conversion reactions. In the case of azo dyestuffs the usual conversion reactions comprise diazotizing and coupling as well as condensation and in the case of most other dyestuff classes condensation reactions.

Examples of suitable carboxyl group-containing azo dyestuffs to be mentioned are the following compounds:

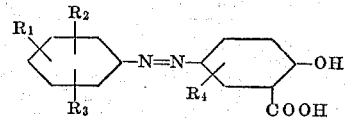

$R_1$, $R_2$, $R_3$=H, $CH_3$, $C_2H_5$, $OCH_3$, $OC_2H_5$, Cl, Br, $OCH_2COOR$, $NO_2$, COOH, $OCH_2COOH$, COOR (R=alkyl),
$R_4$=alkyl.

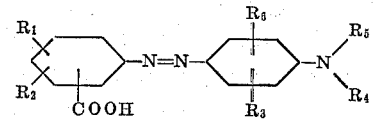

$R_1$, $R_2$=H, $CH_3$, Cl, Br, $NO_2$, $OCH_3$,
$R_3$, $R_6$=H, $CH_3$, $OCH_3$, $OC_2H_5$,
$R_4$, $R_5$=H, $CH_3$, $C_2H_5$, $CH_2CH_2OH$, $CH_2CH_2OR_7$
($R_7$=acylrest).

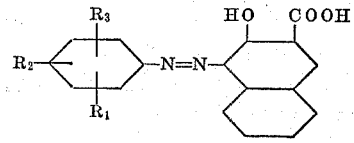

$R_1$, $R_2$, $R_3$=H, $CH_3$, $C_2H_5$, $OCH_3$, $OC_2H_5$, Cl, Br, $NO_2$, COOH.

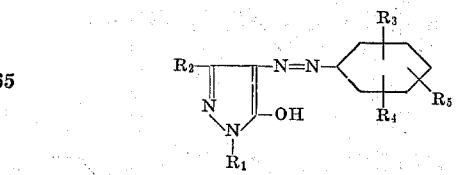

$R_1$=$C_2H_5$, $CH_2CH_2OH$, $C_6H_5$, $C_6H_4Cl$, $C_6H_4COOH$,
$R_2$=$CH_3$, COOH,

R₃, R₄, R₅=H, CH₃, C₂H₅, OCH₃, OC₂H₅, OCH₂COOH, COOH, COOR, OCH₂COOR, NO₂, Cl, Br, CN (R=alkyl).

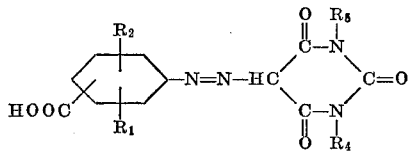

R₁, R₂=H, CH₃, C₂H₅, OCH₃, OC₂H₅, NO₂, Cl, Br,
R₄, R₅=CH₃, C₂H₅, CH₂CH₂OH.

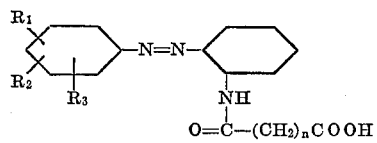

R₁, R₂, R₃=H, CH₃, C₂H₅, OCH₃, OC₂H₅, OCH₂COOH, COOH, OCH₂COOR, COOR, NO₂, Cl, Br, CN,
R₄, R₅=CH₃, C₂H₅, CH₂CH₂OH, CH₂CH₂OR (R=alkyl).
n=0, 1, 2, 3.

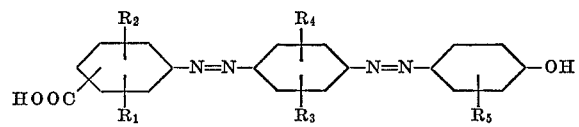

R₁, R₂=H, OH, OCH₃, Cl, NO₂, CH₃,
R₃, R₄=H, CH₃, C₂H₅, OCH₃, OC₂H₅,
R₅=H, CH₃, OCH₃, COOH.

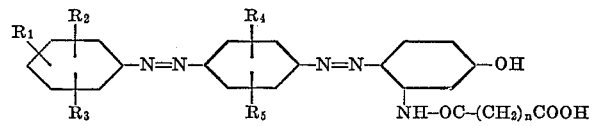

R₁, R₂, R₃=H, CH₃, C₂H₅, Cl, Br, OCH₂COOH, OCH₃COOR, COOH (R=alkyl),
R₄, R₅=H, CH₃, C₂H₅, OCH₃, OC₂H₅,
n=0, 1, 2.

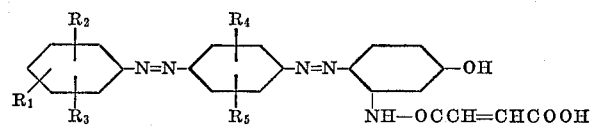

R₁, R₂, R₃=H, CH₃, C₂H₅, Cl, Br, OCH₂COOH, OCH₃COOR, COOH (R=alkyl),
R₄, R₅=H, CH₃, C₂H₅, OCH₃, OC₂H₅.

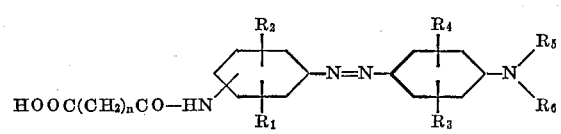

R₁, R₂=H, CH₃, Cl, Br, NO₂, OCH₃,
R₃, R₄=H, CH₃, OCH₃, OC₂H₅, NHCO(CH₂)ₙCOOH, NHCOCH=CHCOOH.

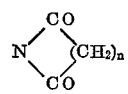

R₅, R₆=H, CH₃, C₂H₅, CH₂CH₂OH, CH₂CH₂OR₇
(R₇=arylrest),
n=0, 1, 2, 3.

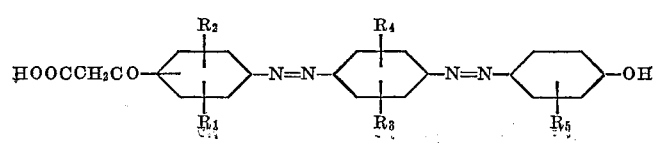

R₁, R₂, R₃, R₄, R₅=H, CH₃, C₂H₅, OCH₃.

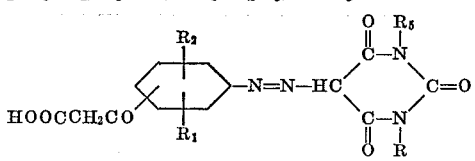

R₁, R₂=H, CH₃, C₂H₅, OCH₃, OC₂H₅, NO₂, Cl, Br,
R₄, R₅=CH₃, C₂H₅, CH₂CH₂OH.

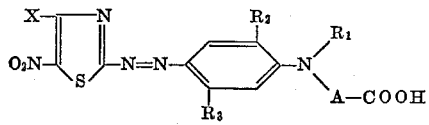

X=H, CH₃, n-C₃H₇, n-C₄H₉
A=—CH₂CH₂—, —CH₂CH₂—O—CH₂CH₂—,
—CH₂CH₂—O—CO—CH₂CH₂—,
CH₂CH₂—O—CO—CH=CH—
R₁=CH₃, C₂H₅, sec. C₄H₉, CH₂CH₂OH, CH₂CH₂OCOCH₃, CH₂CH₂CN
R₂=H, C₁–C₄-alkyl, C₁–C₄-alkoxy
R₃=H, Hal, C₁–C₄-alkyl, C₁–C₄-alkoxy, —NH—CO—R'
(R'=C₁–C₆-alkyl)

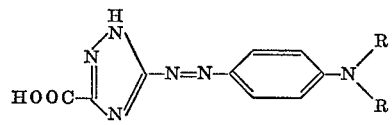

R=CH₃, C₂H₅, C₄H₉

Suitable anthraquinone dyestuffs are those, for example, in which one or more carboxyl groups stand in the anthraquinone molecule itself or in aryl or alkyl radicals which are linked with the anthraquinone molecule via bridge members, such as amino, ether, thioether, sulphonamide or sulphonylamino groups. The anthraquinone compounds may have the following constitution, for example:

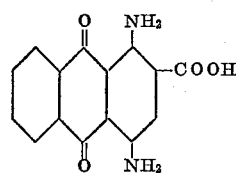

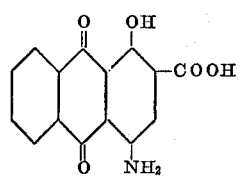

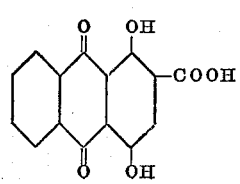

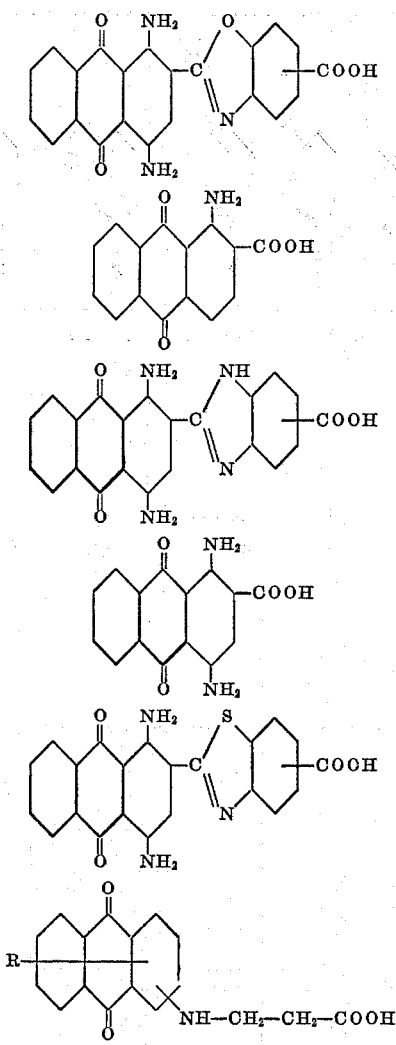

R=Hal, OCH₃

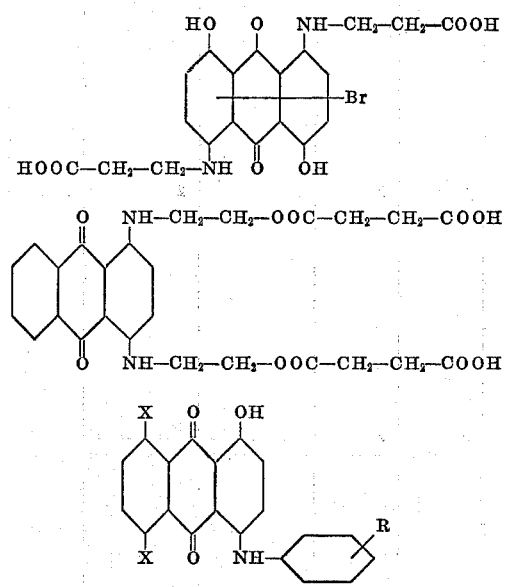

one X=OH
the other X=NO₂, NH₂
R=—COOH, —CH₂—COOH,
—CO—CH₂—CH₂—COOH,
—CO—CH=CH—COOH furthermore, acylation products of aminoanthraquinones for example, of the formulae

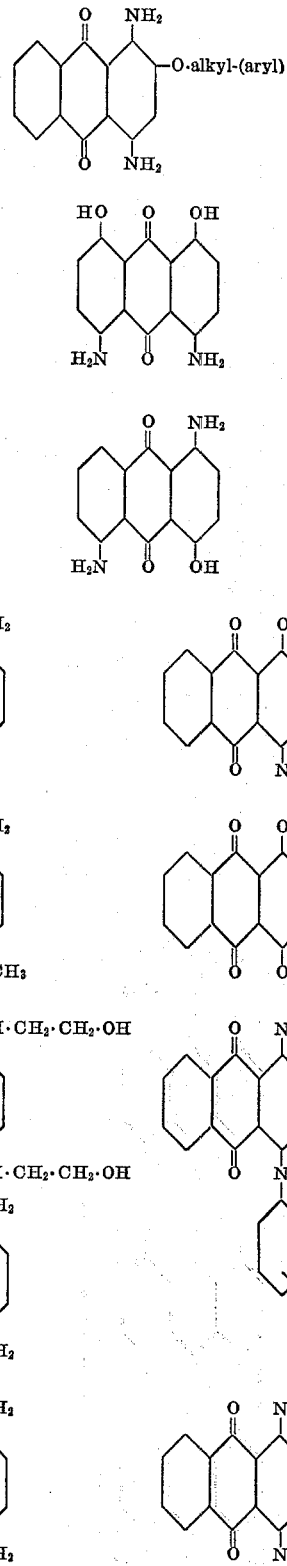

with dicarboxylic acids of the general formula

HOOC—X—COOH

X=alkylene, arylene, a bivalent heterocyclic radical or benzoic acid-3-sulphochloride;
furthermore the anthraquinone dyestuffs set out in the following table:

| Structure | —O—C₂—C₆-alkylene-COOH | —S—C₂—C₆-alkylene-COOH | —NH—C₁—C₆-alkylene-COOH | ⬡—O— COOH | ⬡—S— COOH | ⬡—NH— COOH | —NH—⬡—O—C₁—C₂-alkylene-COOH | —NH—⬡—C₁—C₂-alkylene-COOH | —NH—⬡—S—C₁—C₂-alkylene-COOH |
|---|---|---|---|---|---|---|---|---|---|
| 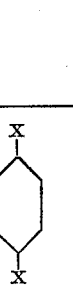 | | | X | | X | | | | |
| Same as above | | X | X | | X | X | | | |
| 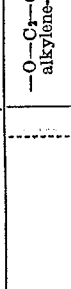 | | X | X | | X | X | X | X | X |
| 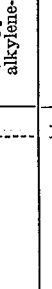 | X | X | X | X | | | | | |
| 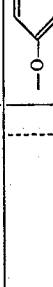 {2 / 3} | X | X / X | | X | X | | | | |
| 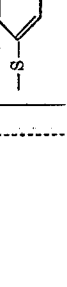 | | X | X | | X | X | X | X | X |
| 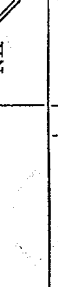 | | X | X | | X | X | X | X | X |
|  {2 / 3} | | X / X | | X / X | X | X | | | |
| 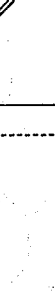 {2 / 3} | | X / X | | X / X | X / X | | | | |

Of the carboxyl group-containing anthraquinone condensation products which exhibit more than three fused rings the following may be mentioned by way of example.: Isothiazole anthrones, such as

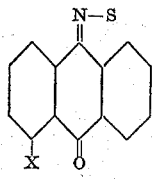 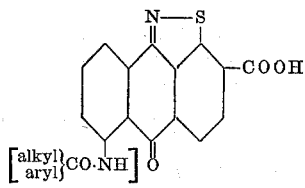

X=S—alkyl—COOH, NH—alkyl—COOH,
S—aryl—COOH, NH—aryl—COOH.

Pyrazole-anthrones, such as

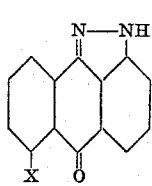 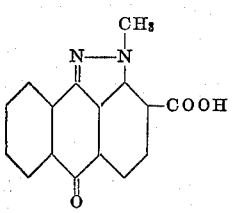

X=S—alkyl—COOH, NH—alkyl—COOH,
S—aryl—COOH, NH—aryl—COOH.

furthermore dyestuffs of the type

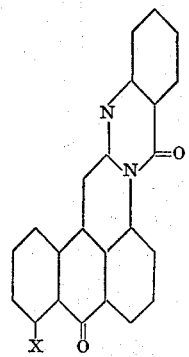 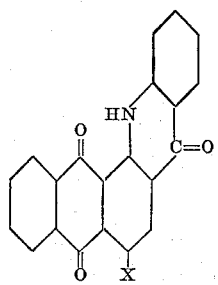

X=S—alkyl—COOH, NH—alkyl—COOH,
S—aryl—COOH, NH—aryl—COOH.

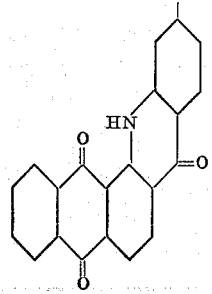 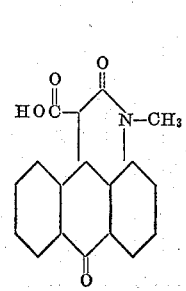

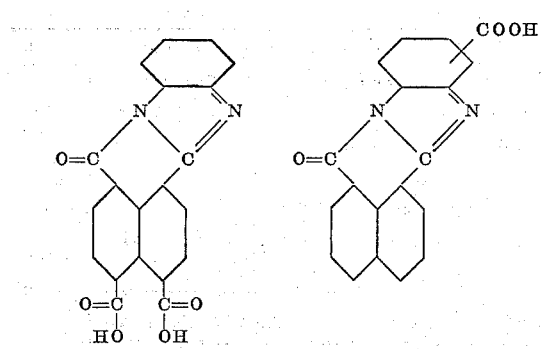

Anthraquinone dyestuffs of the above formulae are produced according to the synthesis principles customary in anthraquinone chemistry. For this purpose, primarily condensation reactions with suitable starting products are to be considered. Thus, for example, amino group-containing anthraquinone compounds in which the amino groups stand in an external position but, preferably, in a nuclear bound position, are condensed with suitable carboxyaryl acid halides or anhydrides, e.g. carboxyphenyl- or carboxynaphthyl-sulphonic acid or -carboxylic acid chlorides or bromides to give the corresponding acid amides or, for example, anthraquinone compounds with labile halogen atoms are reacted with carboxyarylamines, such as carboxyphenyl- or carboxynaphthylamines to give the corresponding carboxyarylamino anthraquinone derivatives. According to similar principles of synthesis anthraquinone ether and thioether derivatives can be produced which contain carboxyl groups in alkyl, aralkyl or aryl radicals of the ether or thioether component. Another possible synthesis of carboxyl group-containing anthraquinone dyestuffs to be used according to the invention consists in that anthraquinone acid halides, such as carboxylic acid and sulphonic acid chlorides or bromides, are converted into the corresponding amides or esters with suitable amino or hydroxy compounds which additionally contain at least one carboxylic acid group. It is obvious that also those anthraquinone compounds can be used for the present process in which one or more carboxyl groups are in a nuclear bound position or in which nuclear bound as well as externally bound carboxyl groups are present.

Representative samples of carboxyl group-containing nitrol dyestuffs to be mentioned are those of the following formula

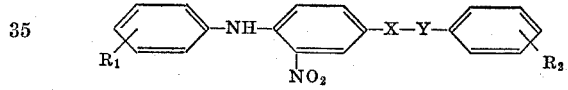

X=—SO₂— or —CO—
Y=—NH— or —O—
R₁=H, Cl, Br, —COOH, $C_1$–$C_4$-alkyl, $C_1$–$C_4$-alkoxy
R₂=H, —COOH, —O—CH₂—COOH,

—O—CH₂—CH₂—COOH

In many cases it has proved to be advantageous when the dyebaths contain small quantities, i.e. up to 1 percent by weight, preferably 0.5 percent by weight, of water, referred to the weight of the organic solvent.

In some cases, moreover, an addition of a non-ionic auxiliary agent to the dyebaths has proved satisfactory. As non-ionic auxiliaries there are particularly used the known surface-active ethoxylation and propoxylation products of fatty alcohols, alkylphenols, fatty acid amides and fatty acids as well as mixtures thereof; the agents are used in amounts of 0.05–2 percent by weight of the organic solvents employed. Instead of adding the auxiliaries directly to the dyebaths, they can also be used with advantage for pasting the carboxyl group-containing dyestuffs thus adding them to the dyebaths in the form of a dyestuff auxiliary paste.

The synthetic fibre materials to be dyed according to the invention are in the main fibre materials obtained from polyesters, such as polyethylene terephthalate, polycyclohexane-dimethylene-terephthalate; heterogenic polyesters obtained from terephthalic acid, sulpho-isophthalic acid and ethylene glycol; or copolyether ester fibres obtained from p-hydroxybenzoic acid, terephthalic acid and ethylene glycol; cellulose triacetate, cellulose-2½-acetate, polyacrylonitrile; synthetic polyamide, such as hexamethylene-diamine adipate, poly-ε-caprolactam or ω-amino-undecanic acid and polyurethanes. The fibre materials can be present in the greatest variety of processing stages, e.g. in the form of filaments, flocks, combed materials, yarns, as piece goods, such as woven and knitted fabrics, or as manufactured articles of wear.

The dyeing process according to the invention is preferably carried out in closed apparatus, for example, in such a manner that the fibre materials are introduced into the dyebath at room temperature, heating the dyebath to 60–170° C. and keeping it at this temperature until the bath is exhausted; this is generally the case after 10–60 minutes. After cooling to room temperature, the liquor is removed and the fibre materials are liberated, optionally after brief rinsing with a fresh organic solvent, from adhering solvent by means of suction filtration or centrifuging and subsequent drying in a warm air current. According to the process of the invenion it is possible to dye synthetic fibre materials with high dyestuff yields and excellent fastness properties in a simple manner from organic solvents.

The carboxyl group-containing dyestuffs to be used according to the invention are substantially insoluble in the organic, water-immiscible solvents. Compared with the dyestuffs previously used for the dyeing of synthetic fibre materials from organic solvents, they are distinguished by a substantially better affinity and an improved fastness to sublimation. Another advantage of the process according to the invention consists in that the depth of colour of the dyeings obtained with a specified proportion of dyestuff: goods to be dyed is substantially independent of the concentration of the dyestuff in the dyebaths and thus also independent of the goods-to-liquor ratio. On account of this independence of the goods-to-liquor ratio used, the process according to the invention can be carried out in all the known dyeing devices, such as winch vats, jiggers and the like, which are known to operate with a different goods-to-liquor ratio in each case, yielding reproduceable dyeings.

The parts in the following examples are parts by weight.

EXAMPLE 1

100 parts of a fabric of textured polyethylene terephthalate fibres are introduced at room temperature without being previously cleaned, into a dyebath which is prepared from 1 part of the monoazo dyestuff 4-aminobenzoic acid ethyl ester→ 1-phenyl-5-pyrazolone-3-carboxylic acid and
1000 parts tetrachloroethylene.

The bath is heated to 115° C. within 10 minutes while vigorously circulating the liquor, and kept at this temperature for 30 minutes. The liquor is then removed and the dyed goods are rinsed at about 40° C. for 5 minutes. After the removal of the rinsing liquor the dyed goods are centrifuged and dried in an air current. An intense yellow dyeing with excellent fastness to sublimation and very good fastness to washing and light is obtained.

An equivalent yellow dyeing was obtained in the same way on a fabric of polycyclohexane-dimethylene-terephthalate fibres.

Yellow dyeings with equivalent fastness properties were likewise obtained when, instead of the above-mentioned dyestuff, the following monoazo dyestuffs were used:

3-amino-4-methoxy-benzoic acid→ 1-phenyl-3-methyl-5-pyrazolone-3-carboxylic acid,
3-amino-benzoic acid→ 1-(3-sulpholanyl)-3-methyl-5-pyrazolone,
4-amino-benzoic acid→ 1-phenyl-5-pyrazolone-3-carboxylic acid amide,
4-amino-benzoic acid→ 1-phenyl-5-pyrazolone-3-carboxylic acid,
1-amino-5-nitro-benzene-2-carboxylic acid→ 1-phenyl-5-pyrazolone-3-carboxylic acid,
3-chloro-3-amino-benzoic acid→ 1-(3-carboxy)-phenyl-3-methyl-5-pyrazolone,
4-amino-benzoic acid→ 1-phenyl-3-methyl-5-pyrazolone or
3-amino-4-methoxy-benzoic acid→ 1-phenyl-3-methyl-5-pyrazolone.

EXAMPLE 2

100 parts of a fabric of triacetate fibres are introduced at room temperature into a dyebath which is prepared from 1 part of the monoazo dyestuff 4-aminobenzoic acid ethyl ester→ 1-phenyl-5-pyrazolone-3-carboxylic acid and
1000 parts tetrachloroethylene.

The bath is heated to 110° C. within 20 minutes while vigorously circulating the liquor and kept at this temperature for 45 minutes. The liquor is then removed and the fabric rinsed at 40° C. with fresh tetrachloroethylene. After removal of the rinsing liquor, the dyed goods are liberated from adhering solvent by centrifuging and drying in an air current. A full, brilliant yellow dyeing of excellent fastness properties is obtained.

EXAMPLE 3

100 parts of yarn of acetate filaments are introduced at about 22° C. into a dyebath which is prepared from 1 part of the dyestuff used in Example 1,
1000 parts tetrachloroethylene,
1.5 parts oleic acid ethanolamide,
1.5 parts ethoxylated oleyl alcohol and
6 parts water.

The bath is heated to 78° C. within 20 minutes and kept at this temperature for 45 minutes. After removal of the dye liquor and rinsing with fresh tetrachloroethylene, the dyed goods are liberated from the adhering solvent by suction filtration and drying in an air current. A brilliant yellow dyeing is obtained.

EXAMPLE 4

100 parts of polyacrylonitrile fibre yarn are dyed in a bath which is prepared as described in Example 3. The bath is heated to 100° C. within 20 minutes and kept at this temperature for 30 minutes. After the customary washing and drying, a yellow dyeing of good fastness properties is obtained.

EXAMPLE 5

100 parts of a fabric of polyethylene terephthalate fibres are heated to 115° C. within 10 minutes in a dyebath containing 1 part of the monoazo dyestuff 3-aminobenzoic acid→ 1-methyl-2,4-dihydroxy-quinoline in
1000 parts tetrachloroethylene, and dyed at the same temperature for 30 minutes. After removal of the liquor, rinsing and drying, a brilliant greenish yellow dyeing with very good fastness to sublimation, washing and light is obtained.

When, instead of the above-mentioned dyestuff, the same amount of one of the dyestuffs set out in the table below is used, dyeings with equivalent fastness properties were obtained with the shades specified in the table:

| Diazo component | Coupling component | Shade |
|---|---|---|
| 2-amino-5-nitrobenzoic acid | 1-methyl-2,4-dihydroxy-quinoline. | Greenish yellow. |
| 1-amino-2,4-dinitrobenzene-6-carboxylic acid. | 3-methyl-N,N-di-$\beta$-oxy-ethylaminobenzene. | Reddish blue. |
| 1-amino-2-chlorobenzene-5-carboxylic acid. | 1-N,N-di-$\beta$-oxyethylamino-3-methylbenzene. | Reddish orange. |
| 3-nitroaminobenzene | N,N-di-($\beta$-carboxymethyl)-aminobenzene. | Reddish Yellow. |
| 2-chloro-4-nitro-1-aminobenzene. | N-dioxethylaniline-bis-maleic acid-semi-ester. | Red. |
| 5-amino-1,2,4-triazole-3-carboxylic acid. | N,N-di-($\beta$-cyanoethyl)-aminobenzene. | Yellow. |
| 4-nitro-2-cyano-1-aminobenzene. | N,N-di-($\beta$-carboxyethyl)-2-ethoxy-5-acetamino-1-aminobenzene. | Navy blue. |
| 2,4-dinitro-6-bromo-1-aminobenzene. | -----do----- | Greenish blue. |
| 2-amino-5-nitrobenzonitrile | 3,3-aniline-dipropionic acid. | Red. |
| 2,4-dinitraniline | -----do----- | Red-brown. |
| 2-amino-5-nitrobenzoic acid | 1-diethylamino-3-acetamino-benzene. | Violet. |

TABLE—Continued

| Diazo component | Coupling component | Shade |
|---|---|---|
| 2-amino-5-nitrobenzonitrile | 1-methoxy-2-dioxethyl-amino-4-glutaramino-benzene. | Blue. |
| Do. | dioxethylaniline-bis-glutaric acid semi-ester. | Bluish red. |
| 2-chloro-4-nitraniline | 3,3'-m-toluido-dipropionic acid. | Red. |
| 2,6-dichloro-4-nitraniline | 3,3'-anilino-dipropionic acid. | Brown-orange. |
| 2-chloro-5-trifluoromethyl-aniline. | ----do---------------- | Orange. |
| 2,5-dichloro-4-nitraniline | 3,3'-m-toluido-dipropionic acid. | Red. |
| 2-chloro-4-nitraniline | N-ethyl-anilino-3'-propionic acid. | Red. |
| 2-amino-5-nitrobenzoic acid | N-cyanoethyl-N-propionic acid-aniline. | Red. |
| 2-amino-5-nitrophenoxy-acetic acid. | N-cyanoethyl-N-propionic acid-aniline. | Red. |
| 2-chloro-4-nitraniline | 3-anilino-mono-propionic acid. | Red. |
| 2-amino-5-nitrobenzonitrile | Dioxethyl-aniline-bis-phthalic acid semi-ester. | Violet. |
| 2-chloro-4-nitraniline | Methyl-oxethyl-aniline-glutaric acid semi-ester. | Red. |
| Do. | Methyl-oxethyl-aniline-succinic acid semi-ester. | Red. |
| 2-amino-5-nitrobenzonitrile | 1-ethoxy-2-dioxethylamino-4-acetamino-benzene-bis-glutaric acid semi-ester. | Blue. |
| 2,4-dinitro-6-bromoaniline | ----do------ | Do. |
| 3-phenyl-5-aminothia-diazole-(1,2,4). | 1-dimethylamino-3-glutar-aminobenzene. | Red-brown. |

EXAMPLE 6

100 parts of a knitted fabric of polyethylene terephthalate fibres are dyed at 115° C. for 30 minutes in a dyebath which contains 1 part of the disazo dyestuff 3-aminobenzoic acid→1-amino - 2,5 - dimethoxy - benzene→salicylic acid in 2000 parts tetrachloroethylene. After the usual rinsing and drying, a brown dyeing with very good fastness to sublimation, washing and light is obtained.

Dyeings with equivalent fastness properties were likewise obtained when the afore-mentioned dyestuff was replaced by the same amount of one of the following disazo dyestuffs. (The shade of the dyeing obtained is given in brackets following each dyestuff.)

4-aminobenzoic acid→aniline→salicylic acid (reddish yellow), 4-aminobenzoic acid→aniline→phenol (reddish yellow), 3-aminosalicylic acid→aniline→di-β-hydroxyethylaniline (red brown), 4-aminophenoxy acetic acid→aniline→salicylic acid (orange) or 4-ethoxycarbonylamino-aniline→aniline→salicylic acid (orange).

EXAMPLE 7

50 parts of a fabric of polyester fibres are introduced at room temperature into a dyebath which is prepared from 0.5 part 4-(3-carboxyanilino)-5-nitro-1,8-anthraquinone, 0.5 part 4-(3-carboxyanilino)-8-nitro-1,5-dihydroxyanthraquinone, 1.5 parts oleic acid ethanolamide, 1.5 parts ethoxylated oleyl alcohol, 6 parts water and 500 parts tetrachloroethylene.

The bath is heated to 120° C. within 10 minutes, while vigorously circulating the liquor and kept at the same temperature for 45 minutes. After removing the dyeing liquor, the dyed goods are rinsed at 40° C. with fresh solvent and, after removal of the rinsing liquor, dried in an air current. A deep blue dyeing of outstanding fastness to light and sublimation is obtained.

When the 500 parts tetrachloroethylene are replaced by the same amount of 1,1,2 - trichloroethane, 1,1,1,2-tetrachloroethane, 1,1,2,2-tetrachloroethane, pentachloroethane, 1,2 - dichloropropane, 2 - chlorobutane, 1,4 - dichlorobutane, chlorobenzene or chlorotoluene, equivalent blue dyeings are obtained.

EXAMPLE 8

100 parts of a fibre yarn of poly-ε-caprolactam are introduced at room temperature into a dyebath which contains 1 part of the dyestuff mixture mentioned in Example 7 in 1000 parts tetrachloroethylene.

The bath is heated to 100° C. within 20 minutes, while vigorously circulating the liquor, and kept at the same temperature for 40 minutes. After this time, the liquor is removed, the material briefly rinsed with fresh solvent and, after centrifuging, the dyeing dried in an air current. A brilliant blue dyeing with good fastness properties is obtained.

An equivalent dyeing was also obtained on yarns of polyhexamethylene-diamino-adipate fibres.

The tinctorial strength can be increased by ~10% by adding to the dyebath.

1 part oleic acid ethanolamide, 1 part ethoxylated oleyl alcohol and 4 parts water.

EXAMPLE 9

100 parts of a polyethylene terephthalate fabric are dyed at 115° C. for 30 minutes in a dyebath of 1 part 4-(3-carboxyaniline)-5-amino-1,2-dihydroxyanthraquinone, 3 parts oleic acid ethanolamide, 3 parts ethoxylated oleyl alcohol, 12 parts water and 1600 parts tetrachloroethylene.

After rinsing with fresh tetrachloroethylene and drying, an intense blue dyeing with very good fastness to sublimation, washing and light is obtained.

When the above-mentioned dyestuff is replaced by the same amount of one of the dyestuffs set out in the table below dyeings with equivalent fastness properties were obtained with the shades specified in the table.

| Dyestuff | Shade |
|---|---|
| 1,4-diamino-anthraquinone-2-carboxylic acid | Blue. |
| 1-amino-4-hydroxy-anthraquinone-2-carboxylic acid | Bluish red. |
| 1,4-diamino-anthraquinone-2,3-dicarboxylic acid | Reddish blue. |
| 2-(3-carboxy-benzoxazolyl-(2))-1,4-diaminoathraquinone | Blue. |
| 4-hydroxy-1-(β-carboxypropionylamino)-anthraquinone | Red. |
| 1-(β-carboxyacryloylamino)-anthraquinone | Yellow. |
| 1,4-bis-(β-(β-carboxyethylcarbonyloxy)-ethylamino)-5,8-dihydroxy-anthraquinone. | Greenish blue. |
| 4-hydroxy-2-(3-carboxyphenoxy)-1-amino-anthraquinone | Bluish red. |
| 4-hydroxy-2-(β-carboxyethoxy)-1-amino-anthraquinone | Yellowish red. |
| 4-hydroxy-2-carboxymethylthio-anthraquinone | Red. |
| 1-amino-4-(3-carboxyanilino)-anthraquinone | Blue. |
| 4,8-dihydroxy-2-(3-carboxy-4-hydroxyphenyl)-1,5-diamino-anthraquinone. | Greenish blue. |
| Do. | Blue. |
| 4,8-dihydroxy-5-nitro-1-(β-carboxyethylamino)-anthraquinone. | Reddish blue. |
| 4,8-dihydroxy-5-amino-1-(β-carboxyethylamino)-anthraquinone. | Blue. |
| 4,8-dihydroxy-1,5-di-(β-carboxyethylamino)-anthraquinone. | Greenish blue. |
| 4,5-dihydroxy-1,8-di-(β-carboxyethylamino)-anthraquinone. | Do. |
| 4,8-dihydroxy-2- or -3-bromo-1,5-di-(β-carboxyethylamino)-anthraquinone. | Do. |
| 1,4,5,8-tetra-(β-carboxyethylamino)-anthraquinone | Blue-green. |
| 4,8-di-hydroxy-2- or-3-carboxymethylthio-1,5-diamino-anthraquinone. | Blue. |
| 4-hydroxy-2-(carboxymethoxymethyl-1,4-cyclohexyl-methoxy)-1-amino-anthraquinone. | Yellowish red. |
| 4-hydroxy-2-(γ-carboxymethoxypropoxy)-1-amino-anthraquinone. | Do. |
| 1,4-dihydroxy-2-(4-carboxyphenylthio)-anthraquinone | Red. |
| 1,4-dihydroxy-2-(β-carboxyethylthio)-anthraquinone | Red. |
| 4-cyclohexylamino-2-(β-carboxyethylthio)-1-amino-anthraquinone. | Blue. |
| 1,9-isothiazolanthrone-2-carboxylic acid | Yellow. |
| 5-(β-carboxyethylthio)-1,9-isothiazole-anthrone | Do. |
| 5-(β-carboxyethylamino)-1,9-pyrazole-anthrone | Greenish yellow. |
| 4-(3-carboxyanilino)-N-methyl-1,9-anthrapyridone | Red. |
| 2-(β-carboxyethylamino)-3,4-phthaloylacridone | Blue. |

TABLE—Continued

| Dyestuff | Shade |
|---|---|
| Naphthoylenebenzimidazole-Bz-3-carboxylic acid | Yellow. |
| Naphthoylenebenzimidazole-1,8-dicarboxylic acid | Do. |
| 1,4-diamino-anthraquinone-2-sulphonic acid-(4-carboxyphenyl ester) | Blue. |
| 4-(4-carboxyphenylthio)-1-amino-anthraquinone | Red. |
| 4-hydroxy-2-(β-carboxymethoxyethoxy)-1-amino-anthraquinone | Yellowish red. |
| 4,5-dihydroxy-8-nitro-(3-carboxymethoxyanilino)-anthraquinone | Greenish blue. |
| 8-hydroxy-1,4,5-tri-(β-carboxyethylamino)-anthraquinone | Do. |
| 4-hydroxy-1-(3-carboxyanilino)-anthraquinone | Reddish blue. |
| 4,5,8-trihydroxy-1-(4-carboxyanilino)-anthraquinone | Blue-red. |
| 1-oxo-2-β-carboxyethyl-3-imino-4,7-diamino-5,6-phthaloyl-isoindoline | Turquoise. |

EXAMPLE 10

100 parts polyethylene terephthalate fibres are heated at 115° C. for 30 minutes, while vigorously circulating the liquor, in a dyebath of 1 part 4-anilino-3-nitro-benzenesulphonic acid (4-carboxyanilide),
3 parts oleic acid ethanolamide,
3 parts ethoxylated oleyl alcohol,
12 parts water, and
1600 parts tetrachloroethylene, centrifuged and rinsed with tetrachloroethylene at 40° C. for 5 minutes. A greenish yellow dyeing of great tinctorial strength and very good fastness to sublimation, washing and light is obtained.

When the tetrachloroethylene is replaced by the same amount of 1,1,2-trichloro-ethane, an equivalent dyeing is obtained.

When the afore-mentioned dyestuff was replaced by the same amount of one of the dyestuffs set out in the table below, dyeings with equivalent fastness properties and the shades specified in the table were obtained.

| Dyestuff | Shade |
|---|---|
| 4-(4-carboxyanilino)-3-nitro-benzene-sulphonic acid anilide | Yellow. |
| 4-(4-carboxyanilino)-3-nitro-benzene-sulphonic acid-(4-carboxyanilide) | Do. |
| 4-(2-methoxyanilino)-3-nitro-benzene-sulphonic acid-(4-carboxyanilide) | Reddish yellow. |
| 4-(4-chloroanilino)-3-nitro-benzene-sulphonic acid-(4-carboxymethoxy-anilide) | Greenish yellow. |
| 4-(4-methylanilino)-3-nitro-benzene-sulphonic acid-(4-carboxyanilide) | Yellow. |
| 4-(3-trifluoromethylanilino)-3-nitrobenzene-sulphonic acid-(3-carboxyanilide) | Greenish yellow. |
| 4-(4-carboxyanilino)-3-nitro-benzenesulphonic acid anilide | Yellow. |
| 4-(4-carboxyanilino)-3-nitro-benzene-sulphonic acid-(4-carboxyphenyl ester) | Do. |
| 4-(4-nitro-2-methylsulphonyl-anilino)-benzoic acid | Lemon-yellow. |
| 4-(4-nitro-2-cyano-anilino)-benzoic acid | Greenish yellow. |
| 4-anilino-3-nitro-benzoic acid anilide | Reddish yellow. |
| 4-(4-carboxyanilino)-3-nitrobenzoic acid-(4-carboxyanilide) | Yellow. |
| 4-(3-carboxyanilino)-3-nitrobenzoic acid anilide | Reddish yellow. |
| 4-(3-ethoxyanilino)-3-nitro-benzoic acid (4-carboxyanilide) | Golden yellow. |
| 4-(3-methylanilino)-3-nitro-benzoic acid (4-β-carboxyethoxy anilide) | Yellow. |
| 4-(4-carboxyanilino)-3-nitro-benzoic acid amide | Do. |
| 4-(4-carboxy-2-nitro-anilino)-benzoic acid amide | Do. |
| 4-anilino-3-nitro-benzoic acid-(4-carboxyphenyl ester) | Do. |
| 4-anilino-3-nitro-benzene-sulphonic acid-(4-carboxyphenyl ester) | Do. |

EXAMPLE 11

100 parts of a polyethylene terephthalate yarn are dyed, as described in Example 10, in a dyebath of 1 part of the quinophthalone dyestuff of the formula

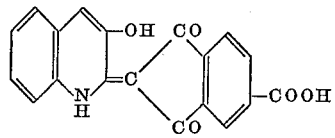

2.5 parts oleic acid ethanolamide,
2.5 parts ethoxylated oleyl alcohol,
10 parts water, and
1600 parts tetrachloroethylene, A clear yellow dyeing is obtained which is distinguished by good fastness to sublimation, washing and light.

An equivalent dyeing is obtained when the above-mentioned quinophthalone carboxylic acid dyestuff is replaced by using a bromination product which can be obtained in known manner by bromination in nitrobenzene or concentrated sulphuric acid, and which contains about 1 atom bromine for each molecule.

Greenish yellow dyeings are obtained by replacing the above-mentioned quinophthalone carboxylic acid dyestuff by equal amounts of one of the methine dyestuffs of the formula

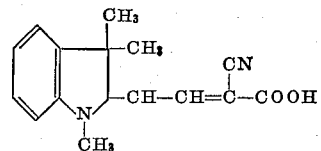

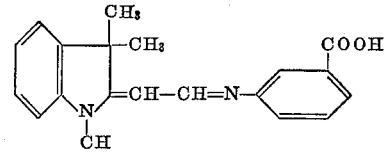

or one of the styryl dyestuffs of the formula

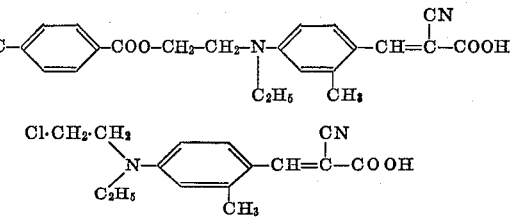

We claim:

1. Process for dyeing synthetic fiber materials by exhaustion comprising introducing synthetic fiber material selected from the group consisting of polyester, polyamide, cellulose-2½-acetate, cellulose triacetate, polyacrylonitrile, and polyurethane, into a dyebath consisting essentially of (A) aliphatic halogenated hydrocarbon, and
(B) an azo, anthraquinone or nitro disperse dyestuff containing 1 to 4 carboxyl groups and substantially insoluble in said dyebath, and dyeing at a temperature of 60° to 170° C. until the dyestuff is exhausted from the dyebath.

2. The process of claim 1 in which said disperse dyestuff is a monoazo dyestuff of the formula

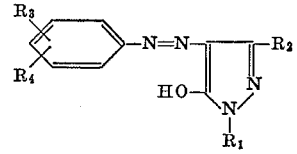

in which $R_1$ is phenyl or phenyl substituted with halogen or carboxyl;

$R_2$ is a $C_1$–$C_4$ alkyl, carboxyl or carboxamide group;
$R_3$ is hydrogen, halogen, $C_1$–$C_4$ alkyl, $C_1$–$C_4$ alkoxy or nitro; and
$R_4$ is carboxyl or carbalkoxy.

3. The process of claim 1 which said disperse dyestuff is a monoazo dyestuff of the formula

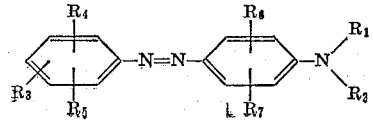

in which $R_1$ and $R_2$, independently of one another, are $C_1$–$C_4$ alkyl, —$CH_2$—COOH, —$CH_2$—$CH_2$—COOH, —$CH_2$—$CH_2$—CN, —$CH_2$—$CH_2$—OH,

—$CH_2$—$CH_2$—O—CO—$CH_2$—$CH_2$—COOH,

—$CH_2$—$CH_2$—O—CO—$CH_2$—$CH_2$—$CH_2$—COOH,

—$CH_2$—$CH_2$—O—CO—CH—CH—COOH, or

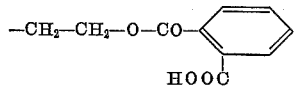

$R_3$ is nitro or trifluoromethyl;
$R_4$ is hydrogen, halogen, nitro, cyano, or carboxyl;
$R_5$ is hydrogen or halogen;
$R_6$ is hydrogen, $C_1$–$C_4$ alkyl, $C_1$–$C_4$ alkoxy, acetylamino, γ-carboxy-butyrylamino or carboxymethyloxy; and
$R_7$ is hydrogen or $C_1$–$C_4$ alkoxy;
with the proviso that at least one of $R_1$, $R_2$ or $R_4$ is a carboxyl group or a carboxyl group-containing radical.

4. The process of claim 1 in which said disperse dyestuff is a disazo dyestuff of the formula

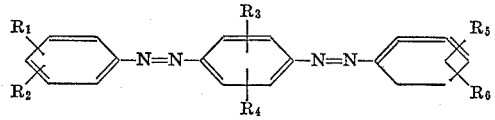

in which $R_1$ is hydrogen or carboxyl;
$R_2$ is hydrogen, hydroxyl, carboxymethyl or carbethoxyamino;
$R_3$ and $R_4$ are, independently of one another, hydrogen or $C_1$–$C_4$ alkoxy;
$R_5$ is hydrogen or carboxyl; and
$R_6$ is hydrogen, hydroxyl or a diethanolamine group;
with the proviso that at least one of the radicals $R_1$ or $R_5$ is a carboxyl group or a carboxyl group-containing radical.

5. The process of claim 1 in which said disperse dyestuff is a nitro dyestuff of the formula

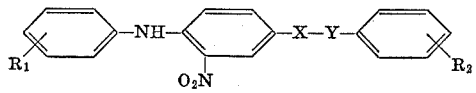

in which
X is —$SO_2$— or —CO—;
Y is —NH— or —O—;
$R_1$ is hydrogen, halogen, carboxyl, $C_1$–$C_4$ alkyl, or $C_1$–$C_4$ alkoxy; and
$R_2$ is hydrogen, carboxyl, carboxymethyloxy or 2-carboxyethyloxy, with the proviso that at least $R_1$ or $R_2$ is a carboxyl group or a carboxyl group-containing radical.

6. The process of claim 1 in which said disperse dyestuff is an anthraquinone dyestuff of the formula

[A]—(X—Y—COOH)$_n$ in which A is an anthraquinone radical or an anthraquinone radical substituted by halogen, hydroxyl, nitro, amino and/or cycloalkylamino;
X is a single C—C bond, —NH—, —O—, —S—, —$SO_2$—, of —$SO_3$—;

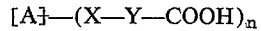

$C_1$–$C_4$ alkylene, $C_1$–$C_4$ alkylene-oxymethylene, $C_1$–$C_4$ alkylene-oxycarbonyl-alkylene, $C_1$–$C_4$ carbonylalkylene, $C_1$–$C_4$ carbonylalkylene, or phenylene-oxy methylene radical; and
$n$ is a number from 1–4.

7. The process of claim 1 in which said disperse dyestuff is an anthraquinone dyestuff of the formula

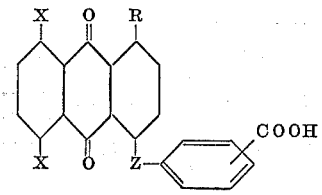

in which
R is hydroxyl or amino;
Z is —NH— or —S—;
X is hydrogen, or one X is hydroxyl and the other X is hydroxyl, nitro or amino.

8. The process of claim 1 in which said disperse dyestuff is an anthraquinone dyestuff of the formula

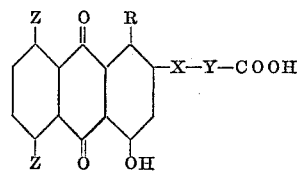

in which
R is hydroxyl or amino;
X is —O—, —S—, or —$SO_3$—;
Y is $C_1$–$C_4$ alkylene, $C_1$–$C_4$ alkyleneoxymethylene or a phenylene radical; and
Z is hydrogen, or one Z is hydroxy and the other Z is amino.

9. The process of claim 1 in which said disperse dyestuff is an anthraquinone dyestuff of the formula

[A]—(NH—Y—COOH)$_n$ in which A is an anthraquinone radical, or an anthraquinone radical substituted by halogen, hydroxyl, nitro and/or amino groups; Y is $C_1$–$C_4$ alkylene, $C_1$–$C_4$ alkyleneoxycarbonylalkylene, $C_1$–$C_4$ carbonyl-alkylene or a $C_1$–$C_4$ carbonyl-alkenylene; and $n$ is a number from 1–4.

10. The process of claim 1 in which said disperse dyestuff is an anthraquinone dyestuff of the formula

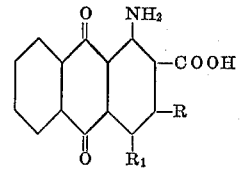

in which R is hydrogen or carboxyl; and $R_1$ is hydroxyl or amino.

11. The process of claim 1 in which said disperse dyestuff is an anthraquinone dyestuff of the formula

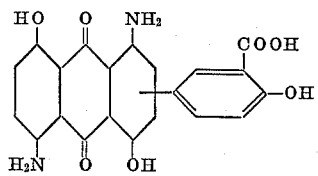

12. The process of claim 1 in which said aliphatic halogenated hydrocarbon is an aliphatic chlorinated hydrocarbon boiling in the range of 40 to 170° C.

13. The process of claim 1 in which said aliphatic halogenated hydrocarbon is tetrachloroethylene, trichloroethylene or 1,1,1-trichloroethane.

14. The process of claim 1 in which the synthetic fiber material is a polyester material.

15. The synthetic fiber material dyed by the process of claim 1.

References Cited

UNITED STATES PATENTS

| | | | |
|---|---|---|---|
| 2,990,002 | 9/1961 | Dayvault et al. | 8—94 |
| 3,129,053 | 4/1964 | Castle | 8—93 |
| 3,480,378 | 11/1969 | Taube et al. | 8—39 |
| 3,510,243 | 5/1970 | Seuret et al. | 8—39 |

OTHER REFERENCES

White, ADR, July 31, 1967, pp. 591–597.

GEORGE F. LESMES, Primary Examiner

P. C. IVES, Assistant Examiner

U.S. Cl. X.R.

8—41 A. B. C, 174, 94

UNITED STATES PATENT OFFICE
CERTIFICATE OF CORRECTION

Patent No. 3,740,185  Dated June 19, 1973

Inventor(s) Karl Neufang et al

It is certified that error appears in the above-identified patent and that said Letters Patent are hereby corrected as shown below:

Column 4, line 7 in the formula, "C-N" should read

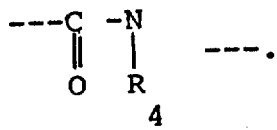

Column 5, line 27 in the formula 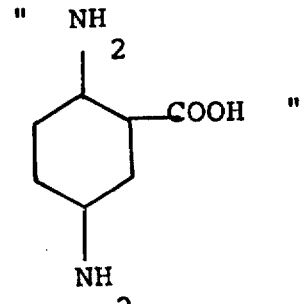

should read -- 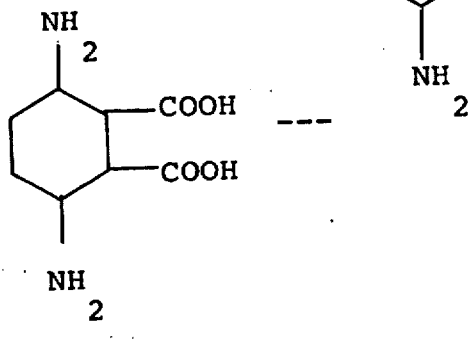 --.

UNITED STATES PATENT OFFICE
CERTIFICATE OF CORRECTION

Patent No. 3,740,185　　　　Dated June 19, 1973

Inventor(s) Karl Neufang et al　　　　Page - 2

It is certified that error appears in the above-identified patent and that said Letters Patent are hereby corrected as shown below:

Column 7, second formula down Same as above" should read

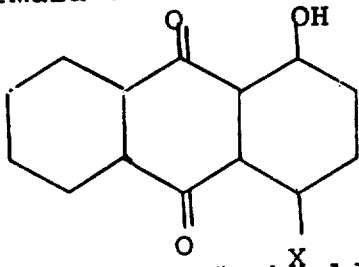

Column 11, line 71, "3-chloro-" should read --- 4-chloro- ---.

Column 14, Example 9 in the Table, 4th sentence down "-diaminoanthraquinone" should read --- -diamino-anthraquinone ---.

Column 15, Example 10 in the table, 3rd sentence from the bottom "2-mitro" should read ---2-nitro---.

Column 16, line 26 in the second formula " 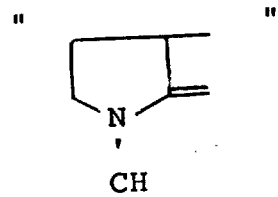 "

should read --- 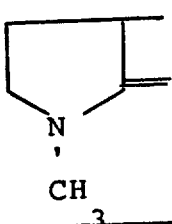 ---.

UNITED STATES PATENT OFFICE
CERTIFICATE OF CORRECTION

Patent No. 3,740,185    Dated June 19, 1973

Inventor(s) Karl Neufang et al    PAGE - 3

It is certified that error appears in the above-identified patent and that said Letters Patent are hereby corrected as shown below:

Column 17, Claim 6, line 64, "of" should read ---or---.

Column 17, line 65, Claim 6, Insert "y is a single C-C bond phenylene,

Signed and sealed this 14th day of January 1975.

(SEAL)
Attest:

McCOY M. GIBSON JR.             C. MARSHALL DANN
Attesting Officer               Commissioner of Patents